(12) United States Patent
Murphy

(10) Patent No.: US 8,090,653 B2
(45) Date of Patent: Jan. 3, 2012

(54) AUTOMATED ACCOUNTING SYSTEM

(75) Inventor: Michael J. Murphy, Salem, NH (US)

(73) Assignee: The Escher Group, Ltd., Cambridge, MA (US)

( * ) Notice: Subject to any disclaimer, the term of this patent is extended or adjusted under 35 U.S.C. 154(b) by 420 days.

(21) Appl. No.: 11/595,301

(22) Filed: Nov. 9, 2006

(65) Prior Publication Data

US 2007/0106613 A1    May 10, 2007

Related U.S. Application Data

(60) Provisional application No. 60/736,110, filed on Nov. 10, 2005.

(51) Int. Cl.
*G06Q 40/00* (2006.01)
(52) U.S. Cl. ............................ 705/40; 705/38
(58) Field of Classification Search ............ 705/40
See application file for complete search history.

(56) References Cited

U.S. PATENT DOCUMENTS

| | | | |
|---|---|---|---|
| 5,521,815 A * | 5/1996 | Rose, Jr. .................... | 705/28 |
| 5,778,350 A * | 7/1998 | Adams et al. .................... | 1/1 |
| 5,799,283 A * | 8/1998 | Francisco et al. ................ | 705/19 |
| 5,875,433 A * | 2/1999 | Francisco et al. ................ | 705/26 |
| 6,078,899 A * | 6/2000 | Francisco et al. ................ | 705/19 |
| 6,405,251 B1 * | 6/2002 | Bullard et al. ................ | 709/224 |
| 6,625,657 B1 * | 9/2003 | Bullard .................... | 709/237 |
| 6,675,350 B1 * | 1/2004 | Abrams et al. ................ | 715/229 |
| 7,567,925 B2 * | 7/2009 | Millary et al. .................... | 705/35 |
| 7,631,065 B2 * | 12/2009 | Schweitzer et al. .......... | 709/224 |
| 7,672,879 B1 * | 3/2010 | Kumar et al. .................... | 705/30 |
| 2002/0032573 A1 * | 3/2002 | Williams et al. .................. | 705/1 |
| 2003/0009402 A1 * | 1/2003 | Mullen et al. .................... | 705/35 |
| 2004/0117275 A1 | 6/2004 | Billera | |
| 2005/0119926 A1 * | 6/2005 | Turetsky et al. .................... | 705/8 |
| 2005/0203892 A1 * | 9/2005 | Wesley et al. ...................... | 707/3 |
| 2006/0080197 A1 * | 4/2006 | Chi ................................ | 705/35 |
| 2009/0240572 A1 * | 9/2009 | Yazdani et al. ................ | 705/10 |

* cited by examiner

*Primary Examiner* — Thomas Dixon
*Assistant Examiner* — Benjamin S Fields
(74) *Attorney, Agent, or Firm* — Cesari and McKenna, LLP

(57) ABSTRACT

A multiple agency transaction accounting system includes a plurality of point of service stations that conduct, for multiple agencies, respective agency transactions that are associated with various reporting requirements, fees and commissions. A universal transaction encoding subsystem encodes the agency transaction data received from the plurality of stations into universal transaction data and supplies the encoded data to a universal transaction settlement subsystem that parses and aggregates the universal transaction data into encoded agency-specific transaction data and provides the encoded agency-specific transaction data to the respective agencies to complete the transaction accounting. The accounting system may also include a money management subsystem that processes fees and commissions associated with the agency transactions in bulk for the respective agencies. The money management subsystem may process the agency transactions as either credit card transactions or bank account transactions.

20 Claims, 3 Drawing Sheets

AUTOMATED ACCOUNTING SYSTEM

CROSS-REFERENCE TO RELATED APPLICATIONS

The present application claims the benefit of U.S. Provisional patent application Ser. No. 60/736,110, which was filed on Nov. 10, 2005, by Michael J. Murphy for an AUTOMATED ACCOUNTING SYSTEM and is hereby incorporated by reference.

BACKGROUND OF THE INVENTION

1. Field of the Invention

The invention relates to automated accounting systems and, in particular to accounting systems for handling agency transactions.

2. Background Information

In many countries postal systems include locally owned or franchised post offices that allow customers to perform various third party, or agency, transactions such as acquiring government licenses, e.g., driving licenses and fishing licenses, paying utility bills, cable TV bills, and so forth, registering cars, renewing insurance, and also certain banking transactions, such as money transfers. For each agency transaction, the postal system receives a commission from the agency and, in the case of franchised post offices, the postal system also pays the franchise owner a commission. In some transactions, a fee is collected from the customer directly, such as a fee for a money transfer transaction, and the fee must also be settled among postal system, local post office, the franchise owner, and the agency. There is thus a complex settlement process for every agency transaction, and the process may differ not only by agency, but also within agency accounts by transaction type. Further, certain agency transactions must be settled immediately with the agency. For example, a customer paying an electric bill requires an immediate acknowledgement from the electric company that the bill is paid.

The commissions are calculated in various ways depending on the agency. The commissions may be paid as fees per transaction, percentages of respective transactions, percentages of total transactions over a given period, percentages of collected customer fees, and so forth. Accordingly, the postal system must keep track of all transactions and the associated commission payment rules to determine what is owed to the system by the various agencies and what is owed to the post offices and/or franchise owners.

To further complicate the agency transactions process, the customers may pay for the transactions with cash, credit card, check and/or other financial instruments, such as vouchers. The non-cash transactions present some amount of risk for the local post office and the franchise owner, particularly for those transactions that must be settled immediately with the agency, because the non-cash methods of payment may not be immediately verifiable. If the non-cash method of payment ends up being false, the post office or the franchise owner remains responsible for a payment to the agency.

Each local post office requires, for handling the agency transactions and local transactions such as item purchases, point of sale equipment, such as a cash register, a credit card acceptance device and a post office transaction register. Each local post office accumulates the agency transaction information using the post office transactions register and provides the transaction data to a central data store, which we refer to herein as a "correspondence server subsystem." The correspondence server subsystem manages the accumulated data for all of the local post offices and provides transaction information, in appropriate formats, to the respective agencies. Thus, the correspondence server subsystem reports bank transactions to the various banks in bank-dictated formats, insurance transactions to the various insurance companies in the appropriate formats for each of the companies, transactions to utility companies in the appropriate formats, and so forth. Further, the correspondence server subsystem necessarily processes the transaction data for each agency separately.

The correspondent server subsystem also provides information relating to all of the transactions to a general ledger at the postal system, for accounting and reconciliation purposes. The postal system and the various agencies then have to determine the commissions payable to the postal office system and to the franchise owners. Transaction settlement operations are also performed at appropriate times to settle cash and non-cash payments to the respective agencies and the remunerations, that is, the commissions, fees and so forth to the postal system, and franchise owners.

The transactions that require immediate settlement must be acknowledged as individual transactions, which involves transmitting the transaction data for each such transaction to the appropriate agency in the requisite format and the agency, in turn, acknowledging the transactions. The local post office thus sends the transaction data for the individual transactions through the correspondence server subsystem, which produces the individual transaction records in the appropriate formats for the particular agencies and provides the data to the agencies. The agencies then process the transaction and provide the appropriate acknowledgements and commission reconciliation information to the postal office system for each such transaction.

The entire accounting process is time consuming and complex, as well as expensive to operate. The local post offices have, regardless of the number of agency transaction performed, the overhead of owning or renting the post office transaction register, as well as the credit card acceptance device and cash registers for handling the cash or non-cash payments for the agency transactions and also purely local transactions. Thus, the local operation has a relatively high equipment overhead. Further, the local post offices have as overhead operating through the postal system accounting system, which operates hardware and software that collects the agency transaction data provided by all of the local post offices and separately processes the transaction data by agency and also in the aggregate to report to the various agencies and the general ledger.

SUMMARY OF THE INVENTION

The invention is a system that simplifies the agency transactions by modifying data management delivery operations and/or money management, or settlement, operations. The inventive system includes an XML document subsystem that collects the agency transaction data from each of the local post offices and encodes the data into a universal agency transaction XML format. The XML encoded transaction data can then be parsed by agency and automatically incorporated into various XML documents that conform to the respective agency reporting requirements either at the respective agencies or by the XML subsystem, as appropriate. The XML subsystem also produces an XML document that conforms to the reporting requirements of the postal system general ledger.

The XML subsystem thus simplifies the transaction reporting and recording process by incorporating all of the reporting requirements in the underlying agency transaction XML format, which involves encoding the data once, and in the same manner, for every type of agency transaction. Any changes to the reporting formats or requirements for a given agency and/or the general ledger are readily incorporated into the agency transaction XML format through either changes to the XML documents or, as necessary, adding elements to underlying agency transaction XML format.

By encoding the transaction data in a universal XML agency transaction format, the money management of the transactions can also be handled in bulk by, for example, an automated clearing house. The automated clearing house can not only handle the payments to the various agencies and to the postal system, local post offices and so forth, the clearing house can also deliver the transaction information to the various agencies—in either the universal agency transaction format or in the respective XML document formats required by the agencies, and report aggregate transaction information to the general ledger, for use in reconciling the commissions. In this way, most of the overhead of the transaction data delivery as well as that of the transaction settlement processing is eliminated from the postal system and is instead replaced by a per transaction fee charged by the clearing house. This is particularly important for those local post offices that perform few transactions and yet must otherwise contribute, in the form of internal transaction fees, to support the operations of the postal system correspondence server subsystem.

The money management operations of the system may be further simplified by treating every method of payment, i.e., cash or non-cash, for an agency transaction as credit card transactions or, alternatively, as bank account transactions. The money management operations are controlled at the point of service end by a universal agency transaction device, which replaces both the credit card acceptance device and the post office transaction device. The universal agency transaction device records all transactions as credit card transactions or, alternatively, as bank account transactions, depending on what organization is handling the settlement of the transactions.

Consider the treatment of all agency transactions as credit card transactions. First, consider the recording of the transaction information.

When a customer renews, for example, a driver's license, with a credit card the postal clerk records in the universal agency transaction device the type of transaction, i.e., driver license renewal—which may be associated with a particular entry code or a button on the device—and also records the requisite customer-specific information such as the name, address, license number and so forth. The clerk further records the credit card information by typing in the information or running the customer's credit card through the device, as appropriate. The device then contacts the credit card company in a conventional manner for an acceptance code and records the code with the transaction information. The clerk then completes the transaction and issues the renewed license. The universal agency transaction device communicates with the XML subsystem, which incorporates the transaction data of interest into the agency transaction XML format, as discussed above.

When the customer pays for the license renewal in cash, the universal agency transaction device uses a post office credit card account to process the transaction as two account entries, namely, a cash advance, or debit, and a payment. Thus, the postal clerk records the transaction type and customer-specific information as discussed above and specifies "cash" as the payment. The device records the transaction as a cash advance by the local post office. The device also records a payment, or credit, to the post office credit card account, to reflect the "depositing" of the cash in the post office cash draw. If the customer instead pays by check or voucher, the device similarly records the transaction as two account entries, i.e., a cash advance to the post office credit card and a payment by check or voucher to the credit card account. The device also communicates the transaction data to the XML subsystem, such that the transaction data is available in the universal transaction XML format.

The credit card company operates in its usual manner to process the various transactions with banks, insurance companies, utility companies and so forth and charges the post office system a per fee transaction on each completed transaction. If, for example, a non-cash method of payment turns out to be false, the credit card company handles the process in its usual manner and reverses the transaction, refunding the transaction fee charged to the postal system, as appropriate, or paying for the transaction and seeking reimbursement from the customer.

Further, the credit card company communicates with the postal system to determine the remunerations, that is, the postal system commissions, that are due. The credit card company then obtains payments from the banks, utilities and so forth and credits the respective post office credit card accounts or, as appropriate, a postal system credit card account for the remunerations. The local post offices can later withdraw cash from the accounts at local ATMs or charge expenses against the credits.

Consider also the recording of all agency transactions as bank account transactions. When a customer renews a driver's license with a credit card the postal clerk records in the universal agency transaction device the type of transaction, i.e., driver license renewal and also records customer-specific information such as the name, address, license number and so forth. The clerk further records the credit card information by typing in the information or running the credit card through the device. The device then contacts the customer's credit card company in a conventional manner for an acceptance code and records the code with the transaction information. The acknowledged credit card payment is treated as a deposit to the post office bank account, and the post office issues the renewed license. The universal agency transaction device also communicates with the XML subsystem, which incorporates the transaction data into the agency transaction XML format, as discussed above.

When the customer pays for the license renewal in cash, the postal clerk records the transaction type and customer-specific information as discussed above and enters cash as the payment type. The device then records the transaction as two account entries, namely, a debit by the local post office and a deposit to the post office bank account that reflects the depositing of the cash at the post office. If the customer instead pays by check or voucher, the post office registry device similarly records the transaction as both a debit to the post office bank account and a deposit of the check or voucher to the post office bank account. The device also communicates the transaction data to the XML subsystem, such that the transaction data is available in the agency transaction XML format.

The bank operates in its usual manner to process the various transactions with banks, insurance companies, utility companies and so forth and charges the postal system a per transaction fee on each completed transaction. If, for example, a non-cash method of payment turns out to be false, the bank handles the process in its usual manner by paying the amount due and charging the check writer with overdraft fees or, as appropriate, reversing the transaction and refunding the transaction fee charged to the postal system. Further, the bank credits the remunerations due the post office as deposits to the post office bank account, after reconciling the amount with the postal service general ledger.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
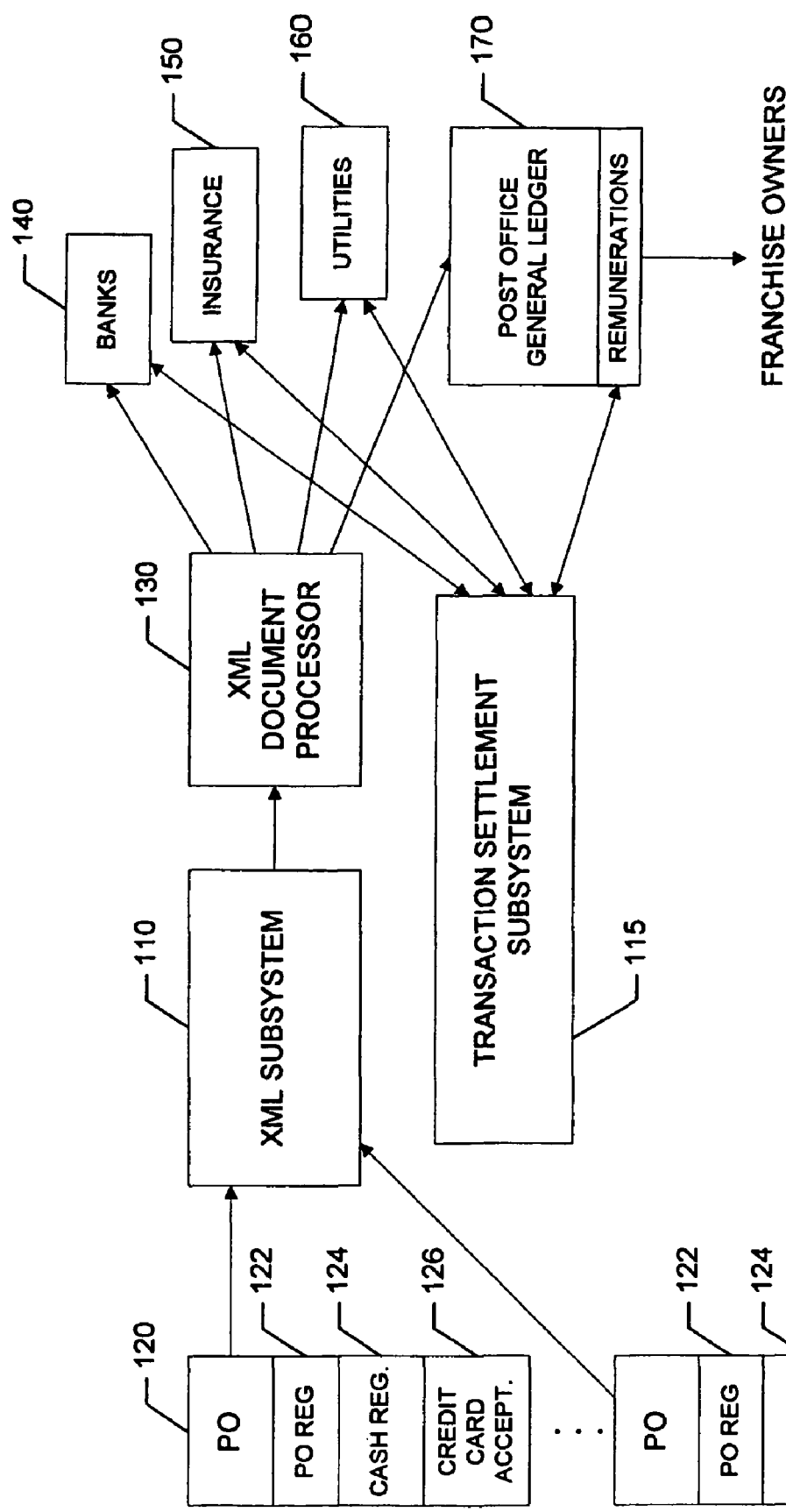
FIG. 1 is a functional block diagram of a system constructed in accordance with the invention.

Referring to the Figures, the inventive system is described in more detail. With reference to FIG. 1, the automated accounting system includes a universal transaction encoding subsystem 110 that receives agency transaction data from local post offices and encodes the data into a universal agency transaction, or XML, format. The XML format includes elements that are of interest to the various agencies and the postal system. For example, the universal agency transaction XML format includes elements for customer name, address and/or other identifying information, an agency identifier, the customer's agency account number, and so forth, and also elements for identifying the transaction type in terms of associated fees and commissions, and so forth.

Once the transaction data is encoded into the XML format, the data is provided to a universal transaction reporting subsystem 130, which incorporates the encoded data of interest into XML documents that are in the formats required for the respective agencies. The reporting subsystem 130 first parses the encoded data by agency and incorporates the relevant data into XML documents that are then made available to the respective agencies. Thus, the document processor provides to a given bank 140 transaction data of interest that relates to the banking transactions that are to be processed through the bank in a format, or XML document, that is dictated by the reporting requirements of the bank. Similarly, the document processor 130 provides transaction data to a given insurance company 150, utility company 160, and so forth.

The document processor 130 also aggregates the parsed transaction data, to provide to the postal system general ledger 170 information that is required for reconciliation of the commissions due from the various agencies to the postal system, and also commissions payable from the postal system to post office franchise owners and so forth.

The XML subsystem 110 encodes all of the agency transaction data in a single XML format and then selectively parses and formats the encoded data for delivery to the various agencies. Accordingly, the data delivery operations of the system are performed in a manner that is both more efficient and less costly than the data delivery operations that require the separate encoding of the data for each of the respective agencies. Also, the XML subsystem can readily encode the transaction data once for a transaction requiring immediate acknowledgement, to both provide the transaction data of interest to the agency and also incorporate the transaction data into the aggregated data that are reported, at the appropriate times, to the postal system general ledger.

The settlement of the transactions may be performed by the system of FIG. 1 in a conventional manner. A transaction control subsystem 115 settles payments with the respective agencies and pays the commissions due to the postal system by the agencies. The postal system then pays the franchise owners their commissions. The transaction settlement occurs at regular intervals, e.g., daily, weekly or monthly.

The document subsystem 130 may be part of the XML subsystem 110, as shown in the drawing, or it may instead by distributed among the various agencies, such that the XML document subsystem parses the data by agency and provides the data to the respective agencies in the universal agency transaction XML format. The respective agencies then select the data of interest by elements and produce the XML documents locally. The agencies can thus utilize the XML encoded data in any manner they require for internal account reconciliation purposes, governmental reporting purposes, and so forth.

As noted in FIG. 1, each local post office 120 utilizes a post office transaction register 122 to key in or otherwise input the agency transaction data. Thus, the post office register records information such as the customer name, the particular agency, agency account information, and any other identifier information required by the respective agencies. The local post offices also utilize one or more cash registers 124 and credit card acceptance devices 126 to handle the transaction payments, as well as any payments for purely local transactions. Accordingly, when an agency transaction takes place, the postal clerk enters the appropriate transaction data using the post office transaction register and records the payment using the credit card acceptance device or the cash register, as appropriate. The information from the cash register and the credit card acceptance device are also provided to the automated accounting system for transaction settlement. The settlement operations may be, as discussed above, handled in the same manner as they are handled by the prior system or, as discussed below, may be handled by an automated clearing house (FIG. 2) or a credit card company or bank (FIG. 3).

The XML subsystem 110 may further provide to the local post offices 120 through the post office transaction register 122 electronic forms for the various agency transactions. The XML subsystem thus provides, in the form of graphical user interfaces (GUIs), forms that include data entry blocks for the data required for the respective agencies and the postal system general ledger. Certain of the data blocks will automatically fill-in as transaction data is entered. Other data, which are not depicted in the GUIs, automatically "attach" to the transaction. For example, the XML subsystem may automatically provide commission information as part of the transaction data once the postal clerk has selected the agency and transaction type. The XML subsystem may also provide transaction information to the postal clerk during the data entry operations, to ensure proper collection of fees, and so forth. For example, the GUI may present agency fee information that reflects the fees that the customer must pay up-front for the particular transaction. The XML subsystem may also automatically update the fee information and/or commission information, as the rates change.

The GUIs provided by the XML subsystem are designed to obtain particular transaction data that are required by the respective agencies and the postal system general ledger and provide the data in an essentially "pre-encoded" format that the XML subsystem 110 can then readily associate with other transaction data, such as fees and commissions, and encode into the universal agency transaction XML format. As discussed, different agencies require different data, and thus, the GUIs may vary by agency and, as appropriate, by agency transaction type.

Figure 2:
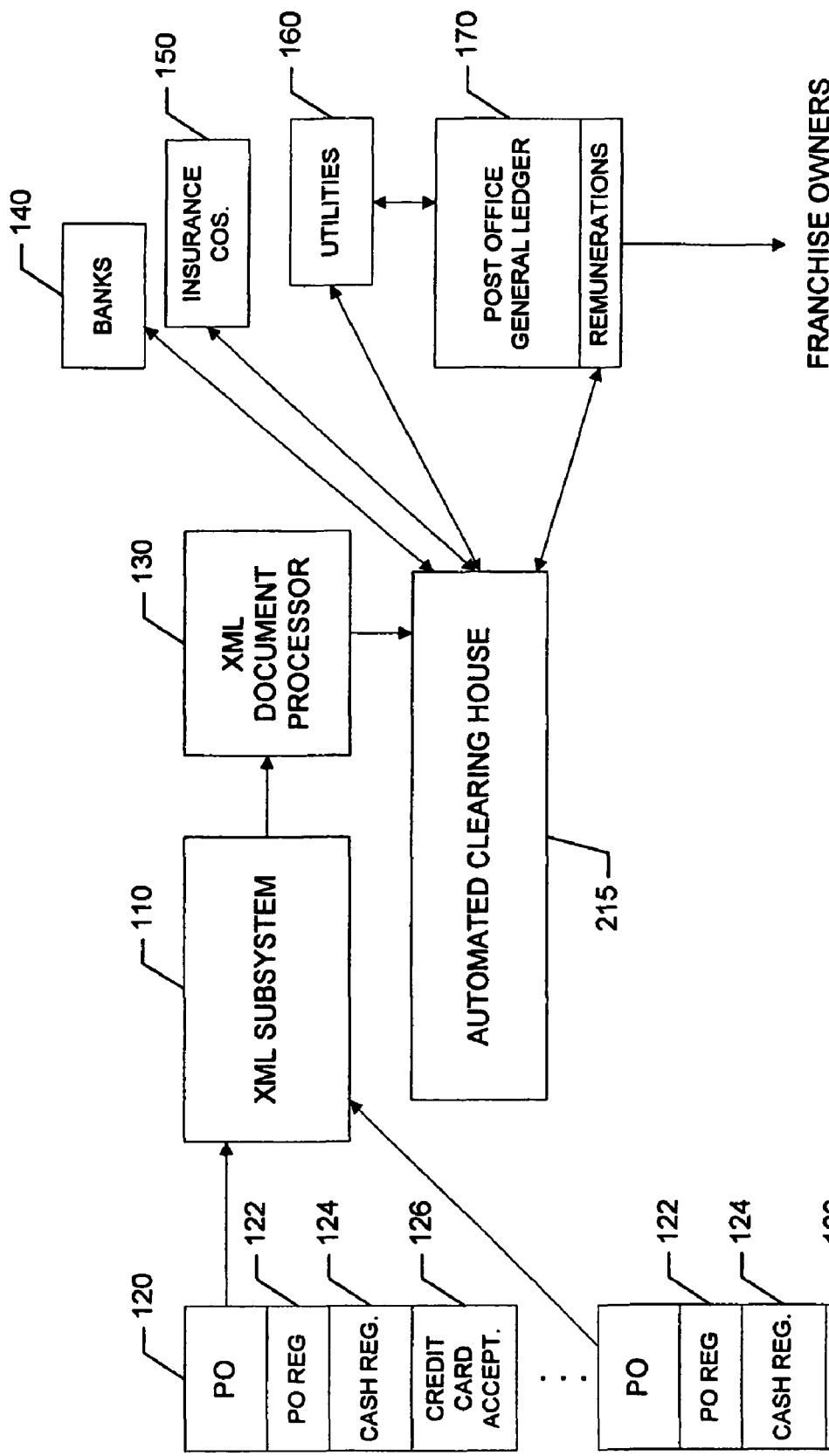
FIG. 2 is a functional block diagram of a system constructed in accordance with an alternative embodiment of the system.
Figure 3:
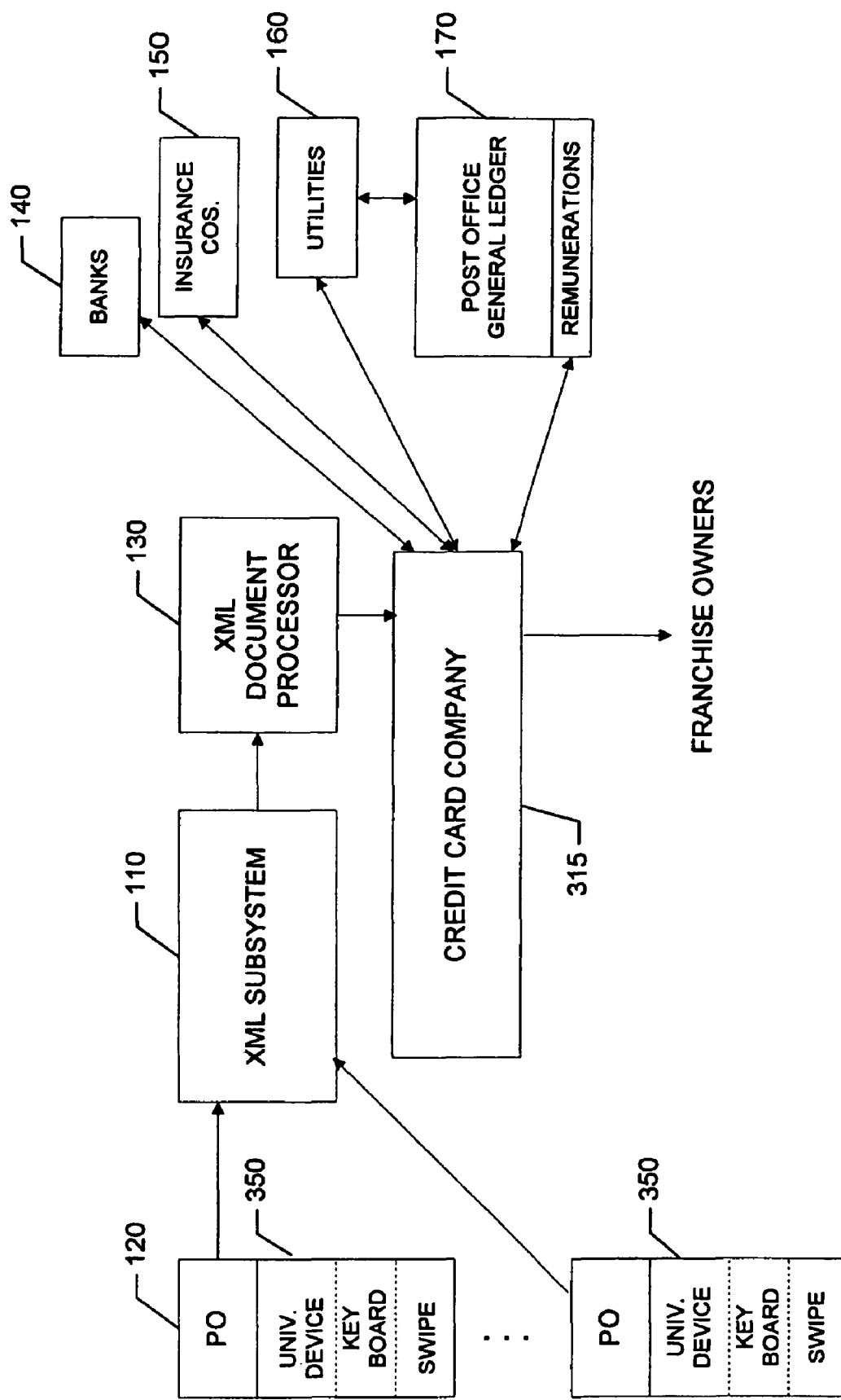
FIG. 3 is a functional block diagram of a system constructed in accordance with a further alternative embodiment of the system.

As shown in FIG. 2, the XML subsystem may instead send the encoded XML data to an automated clearing house 210 that handles transaction settlements with the various agencies. The XML subsystem thus sends the data to the clearing house in the universal agency transaction XML format or in an XML document that conforms to a format set by the clearing house. The automated clearing house then operates in a conventional manner to settle the transactions and pay the funds due the various agencies electronically through various clearing house accounts. As depicted, the automated clearing house may also operate the XML document processor 130, such that the automated clearing house also delivers the transaction data, in the form of XML documents, to the various agencies along with the transaction settlement data. The automated clearing house also reconciles commissions due the postal system general ledger, and then pays the commissions by electronic deposit to postal system clearing house accounts.

Referring now also to FIG. 3, the automated accounting system includes a money management and settlement subsystem that simplifies the automated accounting and settlement operations by treating all methods of agency transaction payment, whether cash or non-cash, as credit card transactions or, alternatively, bank account transactions. The money management and settlement subsystem then utilizes the services of a credit card company 315 or bank (not shown) to settle the transactions as if they were conventional credit card or banking transactions.

The money management and settlement subsystem includes universal agency transaction devices 350 that are used in the local post offices 120 to record agency transaction information and also payment-related information, including the credit card acceptance information. These devices take the place of the post office transaction register 122, the cash register 124 and the credit card acceptance device 126 of FIGS. 1 and 2, for all but local transactions.

The universal agency transaction device 350 includes a keyboard 352 for keying in customer and transaction information and a swipe 354 for recording credit card information, or other information that may be read electronically, such as customer identification information from a customer identification card. When a customer wishes to, for example, renew a driver's license, the postal clerk uses the universal agency transaction device to record all of the transaction data. Thus, the postal clerk keys in or swipes in customer identification information, such as name, address, license number and so forth. The postal clerk then selects the type of payment using a dedicated key or by activating the appropriate button in an associated GUI. If the customer is using a credit card, the clerk next either swipes or keys in the customer's credit card information. The universal agency transaction device then contacts the credit card company, in the same manner as a conventional credit card acceptance device, to obtain an acceptance code from the credit card company. The device then records the acceptance code as part of the transaction data and notifies the clerk, who issues the renewed license. The device communicates the transaction data to the XML subsystem, which encodes the transaction data into the universal agency transaction XML format, as discussed above. At the appropriate times, the XML subsystem provides the transaction data to the government agency that issues driving licenses in either the universal agency transaction XML format or as an XML document through the XML document processor 130. Further, aggregated transaction data is provided, in an appropriate format, to the postal system general ledger 170.

When the customer instead pays for the license renewal in cash, the postal clerk keys in or swipes in the customer identification information, as discussed above. Further, the clerk keys in or selects the payment as cash. Thus, for example, the universal agency transaction device 350 may include payment type GUI buttons for cash, check and so forth, and the postal clerk makes the selection by activating the appropriate button. The device, in response to the entry of the cash payment type, records the transaction as two entries in the accounting system transaction data. The device records the transaction as a cash advance to the local post office from the postal system credit card account, and also as a payment to the post office credit card account, to reflect the "depositing" of the cash in the post office cash drawer. If the customer instead pays by check or voucher, the device similarly records the transaction as two account entries, namely, a cash advance to the post office credit card account and a payment by check or voucher to the credit card account.

The device also communicates the transaction data to the XML subsystem, which encodes the transaction data into the universal agency transaction XML format. The encoded data are then provided to the postal system general ledger 170, the credit card company 315, and depending on which part of the system delivers the transaction data to the agencies, to the various agencies 140, 150, 160. Preferably, the credit card company delivers the data-of-interest to the respective agencies in the XML documents as part of the transaction settlement operations.

The credit card company operates in its usual manner to process the various payments with banks, insurance companies, utility companies and so forth, and charges the postal system a per transaction fee on each completed transaction. The credit card company also receives a statement from the postal system general ledger regarding commissions due to the postal system from the various agencies, and the credit card company settles these commissions by obtaining payment from the agencies in the usual manner and crediting the postal system's credit card accounts and, as appropriate, franchise owners' credit card accounts.

The system similarly handles the transactions if the bank is used for settlement operations rather than the credit card company. The system thus enters debits and credits to the postal system bank accounts for cash, check or voucher transactions. Further, commissions are electronically deposited in the postal system bank account.

The automated accounting and settlement operations thus involve, for each transaction paid for by cash, check or voucher, two entries to record the transaction and two entries for settlement of the transaction. The transaction is recorded as a cash advance from either the postal system checking account or the postal system credit card account and as a payment to the same postal system account by customer check or by electronic funds (i.e., cash) from the postal system checking account. The transaction settlement is recorded as a payment to the agency from the postal system credit card or bank account and a credit to the postal system credit card or payment to the postal system bank account, as appropriate, for the associated commission. Alternatively, the commission may be credited as part of an aggregate amount at a later date, after reconciliation with the postal system general ledger. The settlement operations and the associated accounting are thus automated and take advantage of existing credit card company or bank operations. This relieves the postal system from performing the operations internally, and results in savings to the postal system in terms of time, ease of operations, and overhead costs.

In brief summary, the system improves transaction data delivery through the XML subsystem. This data delivery subsystem may be used with a conventional clearing house to settle the transactions with the appropriate agencies. If this is the case, the post office may use automatic deductions from the post office checking account to provide payments to the various agencies for the cash transactions, such that the clearing house can settle all of the transactions directly with the agencies.

The XML subsystem may also be used in conjunction with the improved money management operations described above, or the improved money management operations may be used with other data delivery operations. The improved money management subsystem simplifies the operations of settling the transactions and determining the associated remunerations from the point of view of the postal system, by treating all transactions, regardless of the form of payment, as one type of transaction—either a credit card transaction or a bank account transaction. The bank or the credit card company is then responsible for the settlement of the transactions. The consolidating of the money management operations to bank or credit card company operations provides significant advantages to the postal system in terms of reduced overhead—i.e., in the reduction in the point of sale equipment required as well as the postal system data processing equipment and personnel required to not only manage the transaction data but also to settle the transactions. Further, the consolidation takes advantage of existing bank or credit card company reporting and settlement operations and thus eliminates those operations from the postal system. The combination of the XML subsystem and the money management subsystem results in even further reduction in the overhead as well as efficiencies in the data delivery operations.

While the invention is described in terms of the postal system, the invention may be used by other systems that process, for multiple agencies, transactions that include licensing grants or renewals, payment transactions and payout transactions that are associated with respective commissions and fees. Examples of such transaction are government passport transactions, government pension payouts, food stamp payouts or payments, and so forth.

What is claimed is:

1. A multiple agency transaction accounting system including:
   A. a plurality of point of service stations for conducting, for multiple agencies, respective agency transactions, wherein each agency is associated with a different set of various reporting requirements, fees and commissions;
   B. a universal transaction encoding subsystem that receives agency transaction data from the plurality of stations and encodes the agency transaction data into universal transaction data; and
   C. a universal transaction settlement subsystem that parses and aggregates the universal transaction data into encoded agency-specific transaction data and provides to the respective agencies associated with the different set of various reporting requirements, fees, and commissions, the encoded agency-specific transaction data that conforms to reporting requirements of each respective agency, wherein for a particular agency transaction associated with a particular agency, a fee is provided to the particular agency and a commission is provided from the particular agency to an entity associated with a particular point of service station where the particular agency transaction was performed, to complete the transaction accounting.

2. The multiple agency transaction accounting system of claim 1 wherein the agency transactions include licensing transactions, payment transactions and payout transactions.

3. The multiple agency transaction accounting system of claim 2 wherein the universal transaction encoding subsystem encodes the agency transaction data into a universal agency transaction XML format.

4. The multiple agency transaction accounting system of claim 3 wherein the universal transaction settlement subsystem provides the encoded agency-specific transaction data in XML documents to the respective agencies.

5. The multiple agency transaction accounting system of claim 2 further including a money management subsystem that receives the encoded universal transaction data and processes fees and commissions associated with the agency transactions in bulk for the respective agencies.

6. The multiple agency transaction accounting system of claim 5 wherein the money management subsystem charges a given point of service station a fee based on the number of agency transactions processed in bulk for the point of service station.

7. The multiple agency transaction accounting system of claim 5 wherein the money management subsystem processes the agency transactions as credit card transactions.

8. The multiple agency transaction accounting system of claim 7 wherein the money management subsystem includes at the respective point of service stations, universal agency transaction devices that process the agency transactions paid for in cash as both a cash advance by a station credit card account and a payment to the station credit card account.

9. The multiple agency transaction accounting system of claim 8 wherein the universal agency transaction devices further process the agency transactions paid for by check as both the cash advance to the station credit card account and the payment to the station credit card account.

10. The multiple agency transaction accounting system of claim 5 wherein the money management subsystem processes the agency transactions as bank account transactions.

11. The multiple agency transaction accounting system of claim 10 wherein the money management subsystem includes at respective point of service stations, universal agency transaction devices that process agency transactions paid for in cash as both a debit to a station bank account and a deposit to the station bank account.

12. The multiple agency transaction accounting system of claim 11 wherein the universal agency transaction devices further process the agency transactions paid by credit card as a deposit to the station bank account.

13. A method for processing multiple agency transactions, the method including the steps of:
   A. receiving, from a plurality of point of service stations, agency transaction data for transactions directed to multiple agencies, wherein each agency is associated with a different set of various reporting requirements, fees and commissions;
   B. encoding, by one or more processors, the agency transaction data into universal transaction data; and
   C. parsing and aggregating, by the one or more processors, the universal transaction data into encoded agency-specific transaction data; and
   D. completing the transaction processing by providing to the respective agencies associated with the different set of various reporting requirements, fees, and commissions, the encoded agency-specific transaction data that conforms to reporting requirements of each respective agency, wherein for a particular agency transaction associated with a particular agency, a fee is provided to the particular agency and a commission is provided from the particular agency to an entity associated with a particular point of service station where the particular agency transaction was performed.

14. The method of claim 13 wherein the step of receiving includes receiving the agency transaction data for licensing transactions, payment transactions and payout transactions.

15. The method of claim 13 wherein the step of encoding includes encoding the agency transaction data into a universal agency transaction XML format.

16. The method of claim 13 wherein the step of completing the transaction processing includes providing the encoded agency-specific transaction data in XML documents to the respective agencies.

17. The method of claim 14 further including processing fees and commissions associated with the agency transactions in bulk for the respective agencies and charging the point of service stations based on the number of agency transactions processed.

18. The method of claim 17 wherein the step of processing fees and commissions further includes processing the agency transactions as credit card transactions and recording agency transactions paid for in cash as both a cash advance to a point of service station credit card account and a payment to the point of service station credit card account, and agency transactions paid for by check as both the cash advance to the point of service station credit card account and the payment to the point of service station credit card account.

19. The method of claim 17 wherein the step of processing fees and commissions further includes processing the agency transactions as bank account transactions and recording agency transactions paid for in cash as both a debit to a point of service station bank account and a deposit to the point of service station bank account, and agency transactions paid by credit card as the deposit to the point of service station bank account.

20. The multiple agency transaction accounting system of claim wherein a given point of service station performs the agency transactions for multiple agencies.

* * * * *